United States Patent
Waterman (10) Patent No.: US 9,751,235 B2
(45) Date of Patent: Sep. 5, 2017

(54) SYSTEM AND METHOD FOR THE RECONDITIONING OF BARRELS INCLUDING A ROBOTIC ARM WITH A REMOVABLE LASER MODULE

(75) Inventor: Breck Donald Waterman, Hawthorne (AU)

(73) Assignee: Diverse Barrel Solutions Pty Ltd, Keswick, South Australia (AU)

(*) Notice: Subject to any disclaimer, the term of this patent is extended or adjusted under 35 U.S.C. 154(b) by 788 days.

(21) Appl. No.: 14/236,794

(22) PCT Filed: Aug. 3, 2011

(86) PCT No.: PCT/AU2011/000979
§ 371 (c)(1),
(2), (4) Date: May 7, 2014

(87) PCT Pub. No.: WO2013/016753
PCT Pub. Date: Feb. 7, 2013

(65) Prior Publication Data
US 2014/0230965 A1 Aug. 21, 2014

(51) Int. Cl.
*B23Q 3/155* (2006.01)
*B23Q 11/00* (2006.01)
(Continued)

(52) U.S. Cl.
CPC ............... *B27M 3/00* (2013.01); *B23C 3/00* (2013.01); *B23Q 3/15536* (2016.11); *B23Q 17/2452* (2013.01); *B23Q 17/2471* (2013.01); *B25J 11/005* (2013.01); *B25J 11/0055* (2013.01); *B25J 15/04* (2013.01); *B25J 19/022* (2013.01);
(Continued)

(58) Field of Classification Search
CPC . Y10T 409/304424; Y10T 409/307672; Y10T 409/308232; Y10T 409/308512; Y10T 409/306944; Y10T 409/307336; Y10T 483/13; Y10T 483/17; Y10T 409/30868; Y10T 409/304088; Y10S 901/09; Y10S 901/41; Y10S 901/47; B25J 19/022
USPC ....... 409/143, 201, 211, 216, 188, 195, 219, 409/137; 318/568.16, 570; 147/1; 901/9, 47, 41; 483/16, 7
See application file for complete search history.

(56) References Cited

U.S. PATENT DOCUMENTS 5,917,600 A * 6/1999 Rongo ................. G01B 11/007
356/622
6,060,853 A * 5/2000 Rongo ..................... B25J 15/04
318/568.16
(Continued)

FOREIGN PATENT DOCUMENTS

WO 2008062244 5/2009
WO PCT/AU2008/001684 5/2009
WO PCT/AU2011/000418 10/2011

*Primary Examiner* — Erica E Cadugan
(74) *Attorney, Agent, or Firm* — Sand & Sebolt (57) ABSTRACT

A system for reconditioning barrels comprising: a robot arm; a router assembly for routing the inside surface of a barrel; and a laser assembly for measuring the inside profile of a barrel, wherein: the router assembly is fixedly attached to the robot arm; and the laser assembly is removably attached to the router assembly thus allowing the laser assembly to be removed while the barrel is being routed in order to protect the laser from airborne particles and vibrations from the router.

4 Claims, 8 Drawing Sheets

(51) Int. Cl.
- *B23Q 17/20* (2006.01)
- *B23Q 17/24* (2006.01)
- *B27C 5/00* (2006.01)
- *B27H 5/08* (2006.01)
- *B23C 3/00* (2006.01)
- *B25J 11/00* (2006.01)
- *B25J 19/02* (2006.01)
- *B27M 3/00* (2006.01)
- *B25J 15/04* (2006.01)
- *B27H 5/00* (2006.01)
- *B23Q 11/08* (2006.01)
- *B08B 9/08* (2006.01)
- *G05B 19/404* (2006.01)

(52) U.S. Cl.
CPC ............... *B27C 5/00* (2013.01); *B27H 5/00* (2013.01); *B27H 5/08* (2013.01); *B08B 9/0808* (2013.01); *B08B 9/0821* (2013.01); *B23Q 11/005* (2013.01); *B23Q 11/0067* (2013.01); *B23Q 11/08* (2013.01); *G05B 19/404* (2013.01); *Y10S 901/09* (2013.01); *Y10S 901/41* (2013.01); *Y10S 901/47* (2013.01); *Y10T 409/30756* (2015.01); *Y10T 409/30868* (2015.01); *Y10T 409/304088* (2015.01); *Y10T 409/304424* (2015.01); *Y10T 409/306944* (2015.01); *Y10T 409/307672* (2015.01); *Y10T 483/115* (2015.01); *Y10T 483/13* (2015.01); *Y10T 483/15* (2015.01); *Y10T 483/17* (2015.01); *Y10T 483/18* (2015.01)

(56) References Cited

U.S. PATENT DOCUMENTS

| | | | |
|---|---|---|---|
| 6,285,920 B1 * | 9/2001 | McGee | G05B 19/423 219/125.11 |
| 7,771,146 B2 * | 8/2010 | Waterman | B08B 9/0808 147/1 |
| 2008/0102179 A1 | 5/2008 | Rogers | |
| 2010/0122614 A1 * | 5/2010 | Waterman | B08B 9/0808 83/360 |
| 2011/0203093 A1 * | 8/2011 | Dollinger | B27H 5/08 29/402.06 |

* cited by examiner

Compressed Air Line Directed to Blow Air Over
External Optical Components of the Laser Assembly
when the Laser Assembly is Within the Stand

Fig. 7

SYSTEM AND METHOD FOR THE RECONDITIONING OF BARRELS INCLUDING A ROBOTIC ARM WITH A REMOVABLE LASER MODULE

FIELD OF THE INVENTION

This invention relates to a system and method for the reconditioning of barrels, in particular a system including a robotic arm with a removable laser module.

BACKGROUND TO THE INVENTION

Details of robotic systems for the reconditioning of barrels have been previously disclosed by the present applicant in for example International Applications PCT/AU2008/001684 and PCT/AU2011/000418. Whilst presenting an improvement over the prior art, further improvements to these systems are possible.

The prior art systems incorporate a laser scanner for mapping the internal profile of a barrel and a router for removing a surface layer of the barrel; with the trajectory of the router being calculated from the measured profile of the barrel. Precise measurement and routing is required in order to optimally recondition a barrel, with the alignment of the laser and the router being critical.

In a first prior art system the laser scanner and the router are both fixedly attached to the end of a robotic arm. Whilst this system ensures that the laser and the router are well aligned, having the laser co-located with the router whilst routing introduces problems. The first problem being vibrations from the router damaging mechanical and electronic components of the laser scanner, in particular electromechanical components such as crystal oscillators. The second problem being debris from the router obscuring the optical paths of the laser scanner.

In a second prior art system the laser scanner and the router are attached to separate robotic arms. This arrangement ensures that vibrations and debris from the router do not affect the laser scanner, however it introduces the problem of accurately aligning the laser scanner and the router. The accuracy of the system is further compromised in that it is first required to locate the barrel with respect to the laser scanner and then with respect to the router. Such a system also carries the cost and complexity of having two robotic arms.

The object of this invention is to provide a system for the reconditioning of barrels that alleviates the above problems, or at least provides the public with a useful alternative.

SUMMARY OF THE INVENTION

Therefore in one form of the invention there is proposed a system for reconditioning barrels comprising: a robot arm; a router assembly for routing the inside surface of a barrel; and a laser assembly for measuring the inside profile of a barrel, wherein: the router assembly is fixedly attached to the robot arm; and the laser assembly is removably attached to the router assembly.

Preferably the system further comprises a stand for accepting the laser assembly when detached from the router assembly Preferably the stand incorporates a moveable cover for covering electrical contacts of the laser assembly.

In preference the system further comprises a compressed air line directed to blow air over the external optical components of the laser assembly when the laser assembly is within said stand.

Preferably the system further comprises a floor on which a barrel is stood and a clamping mechanism for securing said barrel in a fixed position; said floor comprising trap doors moveable from a first position wherein the barrel is supported by the trap doors to a second position wherein the barrel is not supported by the trap doors.

In a further form of the invention there is a method for reconditioning of barrels, comprising the steps of: removably attaching a laser scanner to a robotic arm with a router attached; scanning the inside profile of a barrel with the laser scanner; detaching the laser assembly from the robotic arm; and routing the inside of the barrel with the router according to a path determined from the scanned inside profile of the barrel.

Preferably the method further comprises the step of cleaning said laser scanner with compressed air before scanning the inside profile of the barrel.

Preferably the method further comprises the steps of: covering electrical contacts of the laser scanner when the laser scanner is detached from the robotic arm; and uncovering said electrical contacts before attaching the laser scanner to the robotic arm.

It should be noted that any one of the aspects mentioned above may include any of the features of any of the other aspects mentioned above and may include any of the features of any of the embodiments described below as appropriate.

BRIEF DESCRIPTION OF THE DRAWINGS

The accompanying drawings, which are incorporated in and constitute a part of this specification, illustrate various implementations of the invention and, together with the description, serve to explain the advantages and principles of the invention. In the drawings.

LIST OF COMPONENTS

10 Barrel reconditioning system
11 Robot arm
12 Control system
13 Router assembly
14 Laser assembly
15 Robot rotating mandrel
16 Stand
18 Barrel
20 Laser displacement sensor
21 Laser window
22 Sensor window
23 Laser bracket
24 Tool interface 25 Tool electrical module
26 Alignment studs
27 Laser cable
28 Alignment pins
30 Master interface
31 Master electrical module
34 Base angle plate
36 Mandrel
37 Steady
38 Electrical slip ring
40 Pneumatic slip ring
42 Router drive plate
44 Router motor
45 Router bit
50 Stand leg
51 Stand foot
52 Stand platform
53 Tool rack
54 Alignment grooves
55 Tool cover
56 Swivel actuator
70 Floor
71 Robot stand
72 Trap doors
73 Conveyor belt
74 Clamping posts
75 Clamping mechanism

DETAILED DESCRIPTION OF PREFERRED EMBODIMENT

The following detailed description of the invention refers to the accompanying drawings. Wherever possible, the same reference numbers will be used throughout the drawings and the following description to refer to the same and like parts. Dimensions of certain parts shown in the drawings may have been modified and/or exaggerated for the purposes of clarity or illustration.

Figure 1A:
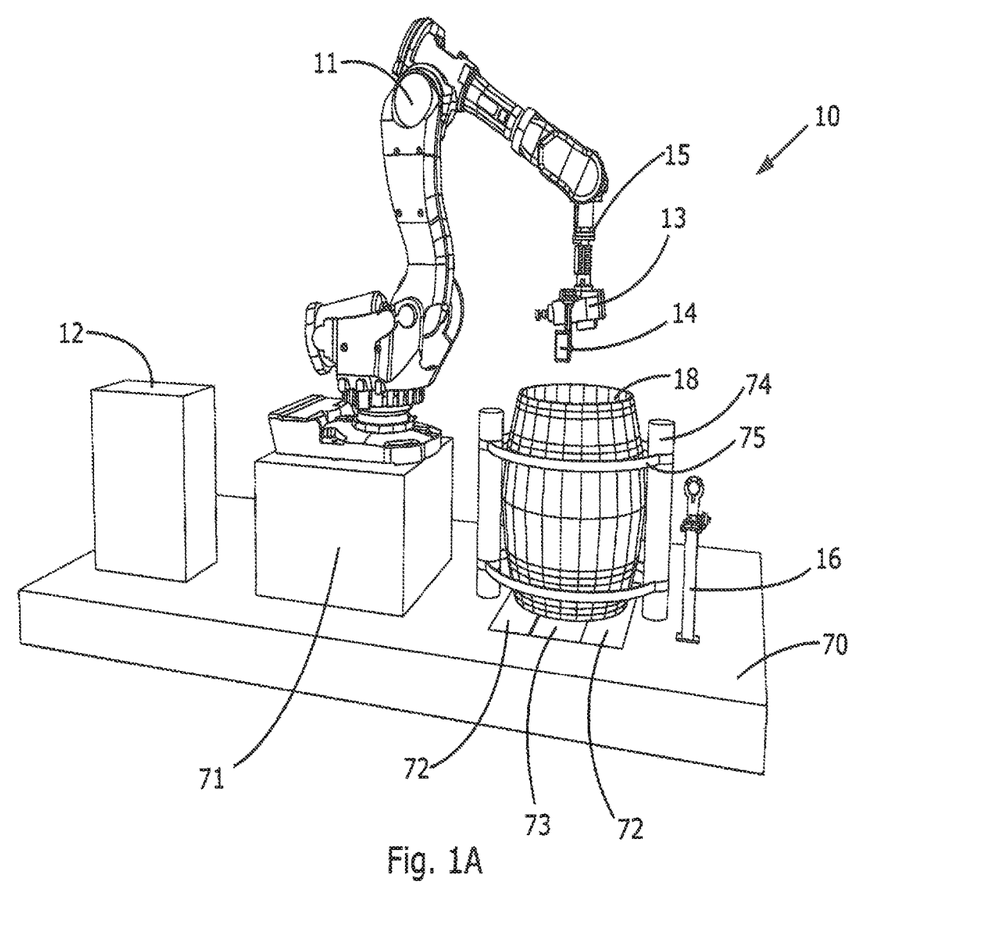
FIG. 1A is a perspective view of a barrel reconditioning system of a preferred embodiment of the invention.

The present invention relates to a system 10 and method for reconditioning a barrel 18. As seen in FIG. 1A the main features of the barrel reconditioning system 10 are: a multi-axis robot arm 11 under the control of a control system 12; a router assembly 13 fixedly attached to the end of the robot arm 11; a laser assembly 14 removably attached to the router assembly 13 and a stand 16 for accepting the laser assembly 14.

Figure 1B:
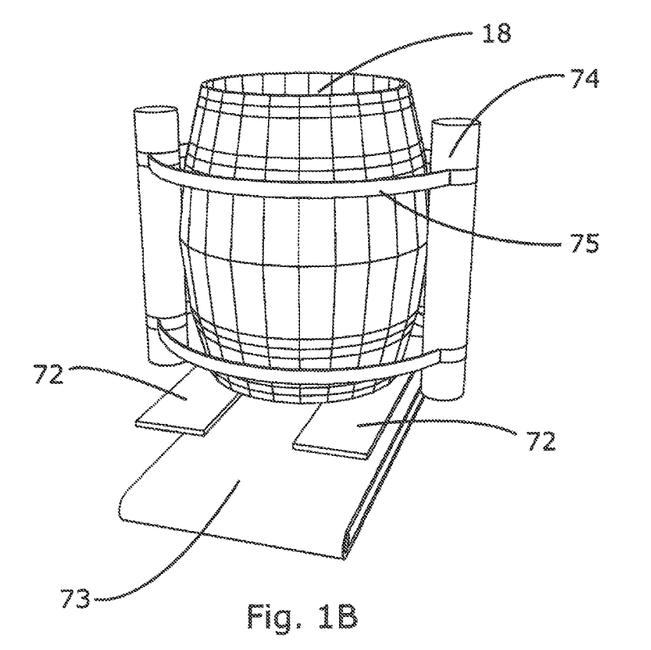
FIGS. 1B and 1C are partial views of the system showing details of trap doors beneath a barrel to be reconditioned in a first and second position.
Figure 1C:
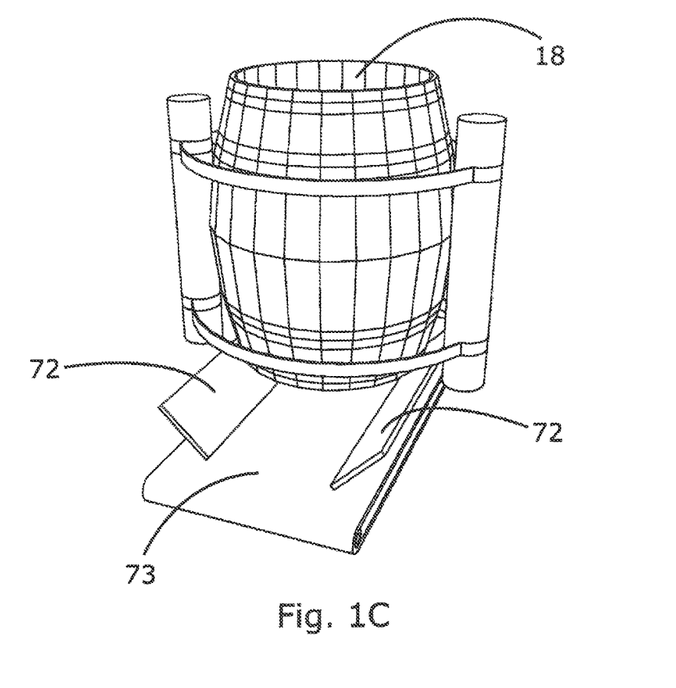

The system 10 is mounted in an enclosure of which only the floor 70 is shown in the figures for the sake of clarity. The enclosure is sealed to allow the extraction of wood dust and shavings produced during reconditioning. The floor incorporates a stand 71 for elevating the robot arm 11 to an appropriate working height. The system also incorporates clamping posts 74 and clamping mechanism 75 for securely locating a barrel whilst being reconditioned. The floor 70 incorporates two trap doors 72 on which the barrel is initially mounted. Once the barrel is secured by the clamping mechanism 75, the trap doors 72 swing away from the bottom of the barrel allowing any wood dust and shavings produced during reconditioning to fall through the bottom of the barrel and onto a conveyor belt 73 for removal. By having a void beneath the barrel clearance is also provided for the laser assembly 14, allowing a scan to be performed all the way to the bottom of the barrel without the extremities of the laser assembly coming in contact with the floor. Details of the operation of the trap doors 72 are shown in FIGS. 1B and 1C in which the floor has been cut away. The trap doors 72 are hingedly attached to the floor along one side and are positioned by means of pneumatic actuators (not shown).

The reconditioning process comprises two main steps, scanning and routing, both performed with the aid of the robot arm 11 under control of the control system 12.

During the scanning process, the laser assembly 14 is attached to the router assembly 13 and traverses the inside of the barrel 18 in order to accurately measure the inside profile of the barrel. The profile information is stored by the control system 12. Prior to the scanning process the laser assembly is cleaned with the aid of compressed air to remove any dust or particles that may interfere with the scan.

After the barrel has been scanned the laser assembly 14 is detached from the router assembly 13 and stored on the stand 16. This ensures that the laser assembly 14 is removed from the dust and shavings produced during the routing process and is not subject to vibrations produced by the router.

During the routing process, the router assembly 13 traverses a path calculated by the control system 12 using the barrel profile information previously stored to enable the router to remove a predetermined depth (typically 6-8 mm) of material from the inside surface of the barrel. A positive air flow is maintained in the enclosure to ensure that airborne dust and shavings do not settle on the laser assembly 14.

Figure 2:
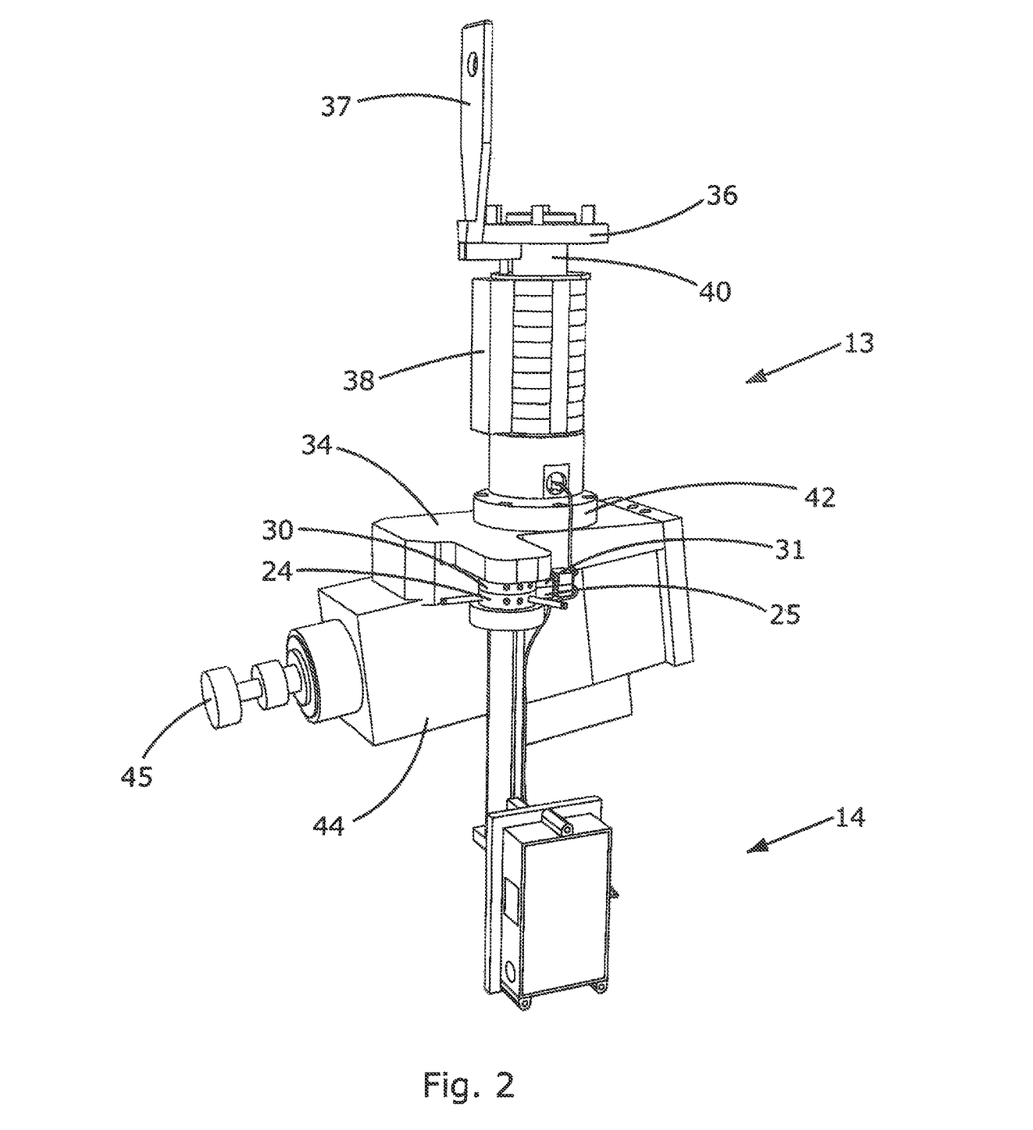
FIG. 2 is a detailed view of a router assembly with a laser assembly attached.

The router assembly 13 with the laser assembly 14 attached are shown in greater detail in FIG. 2.

The two assemblies are held together by a pneumatically operated robotic tool changer as is well known in the art. The tool changer comprises a master interface 30 on the router assembly side and a tool interface 24 on the laser assembly side. Pneumatic ports on the master interface 30 are used to engage and disengage a locking mechanism that holds the two interfaces together. The interfaces 30 and 24 have attached electrical modules 31 and 25 that allow electrical connectivity to the laser assembly when attached to the router assembly.

A mandrel 36 of the router assembly 13 is attached to a rotating mandrel 15 (seen in FIG. 1) at the end of the robot arm 11; allowing the router assembly to rotate through 360 degrees with respect to the robot arm. The router assembly incorporates a steady 37 that is attached to a non-rotating portion of the robot arm in order to allow connections to electrical and pneumatic lines via electrical slip ring assembly 38 and pneumatic slip ring 40 with the fixed portions of the slip ring assemblies being rigidly attached to the steady. The mandrel 36 includes a shaft (obscured) that passes through the slip rings 38 and 40 and engages the router drive plate 42, thus allowing the attached base angle plate 34 to rotate with respect to the robot arm 11. Attached to the base angle plate 34 are the router motor 44 with router bit 45 and the master interface 30 to which the laser assembly 14 is removably attached.

Figure 3:
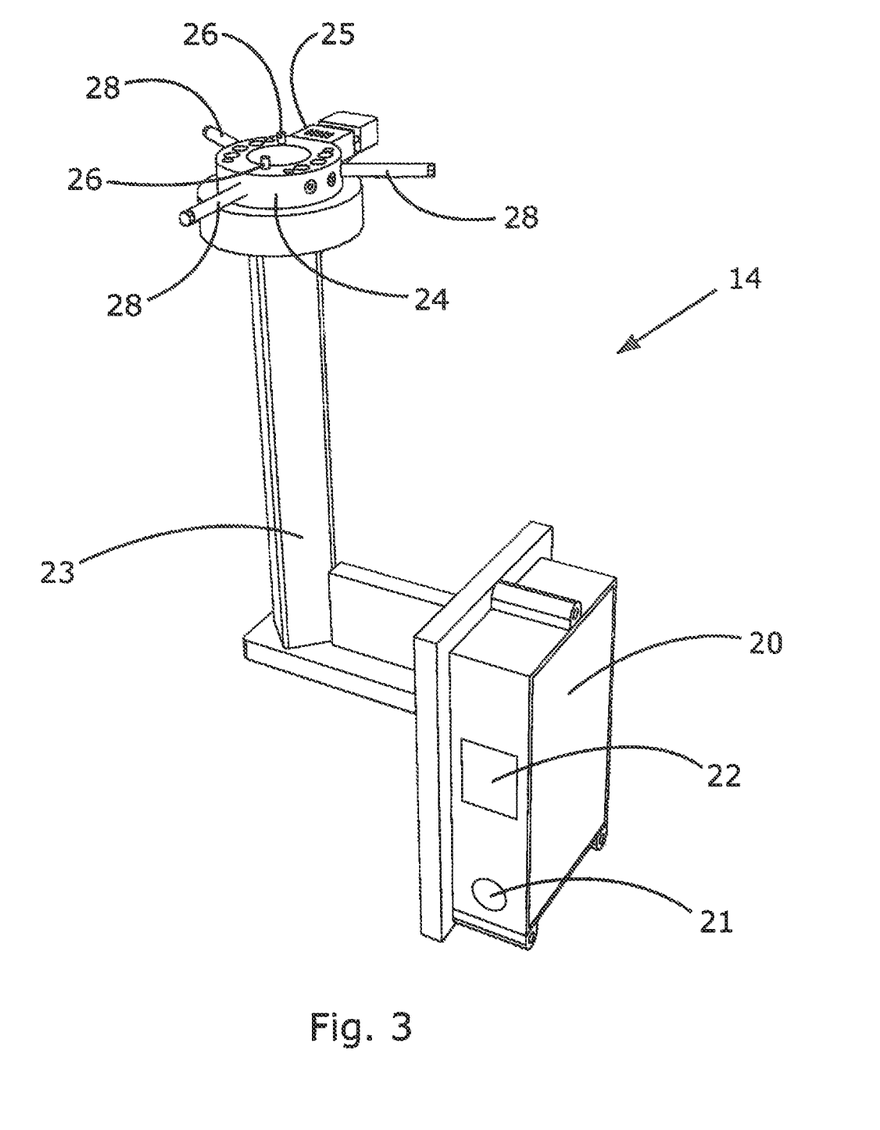
FIG. 3 is a detailed view of the laser assembly.

FIG. 3 shows the laser assembly 14 detached from the router assembly 13. The laser assembly 14 comprises: tool interface 24 for attachment to the router assembly; laser bracket 23 and laser displacement sensor 20. The tool interface 24 has alignment studs 26 to ensure accurate alignment with the router assembly 13 and alignment pins 28 allowing the laser assembly to be held on a stand 16 as discussed below.

The laser displacement sensor 20 is an off the shelf component for measuring distance and includes a laser window 21 through which a laser is shone and a sensor window 22 through which laser light that is reflected from an object is sensed. One can readily appreciate the need to keep the windows 21 and 22 clean in order for the sensor to perform measurements.

Electrical connectivity from the sensor 20 via the router assembly 13 using electrical slip rings 38 and ultimately to the control system 12 is provided by cable 27 (seen in FIG. 5) and tool electrical module 25.

Figure 4:
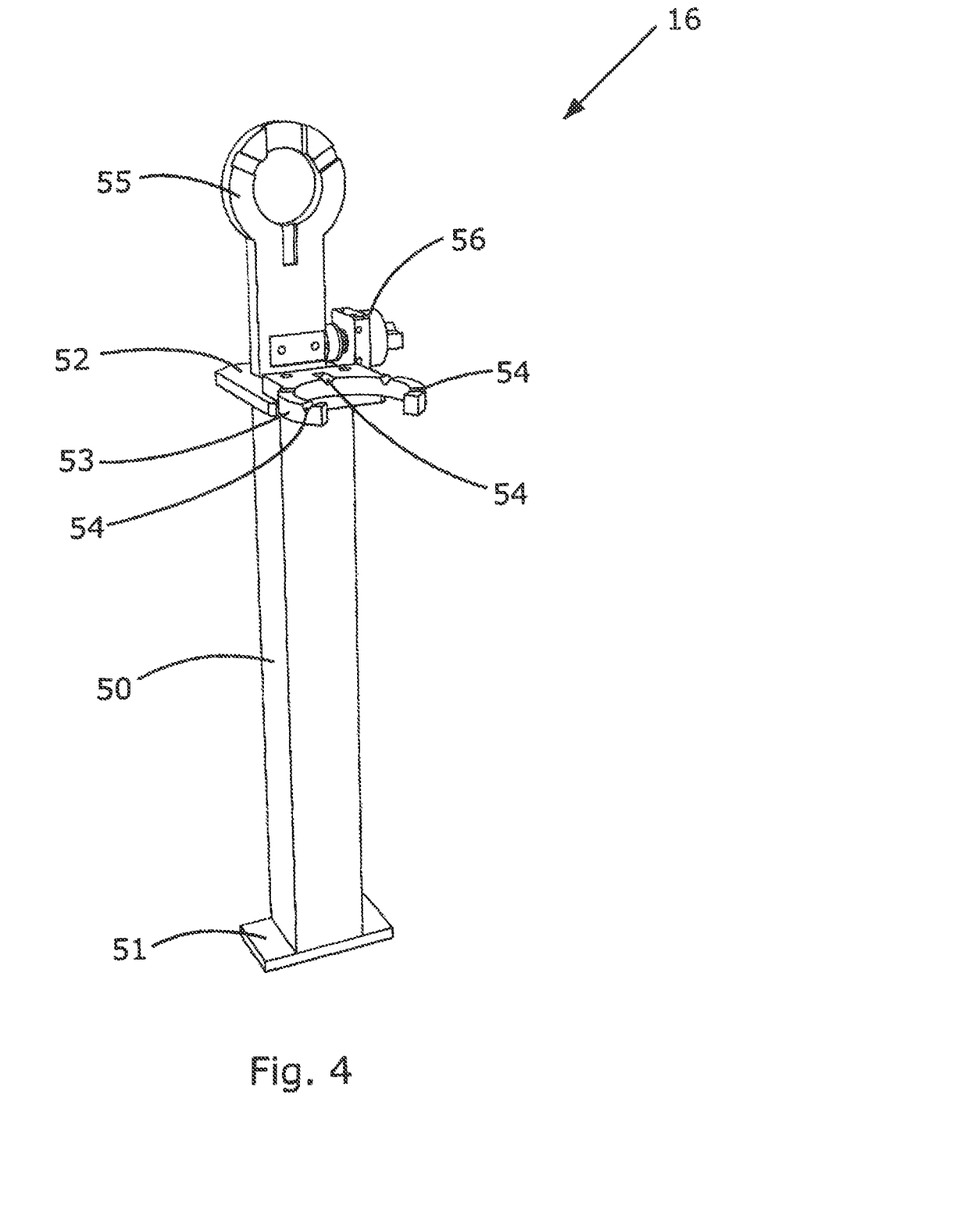
FIG. 4 is a view of a stand for accepting the laser assembly.

FIG. 4 shows a stand 16 used to hold the laser assembly 14 when not attached to the router assembly. The stand 16 comprises a platform 52 to which a tool rack 53 is attached. The tool rack 53 accepts the laser assembly 14 with the alignment pins 28 of the laser assembly resting within alignment grooves 54. A tool cover 55 is provided to shield the tool interface 24 and associated electrical module 25 from airborne particles produced when the barrel is being routed. The cover 55 is positioned by means of attached pneumatically operated swivel actuator 56 which in turn is attached to the platform 52. The platform 52 is held clear of the floor by leg 50 which is secured to the floor by foot 51.

Figure 5:
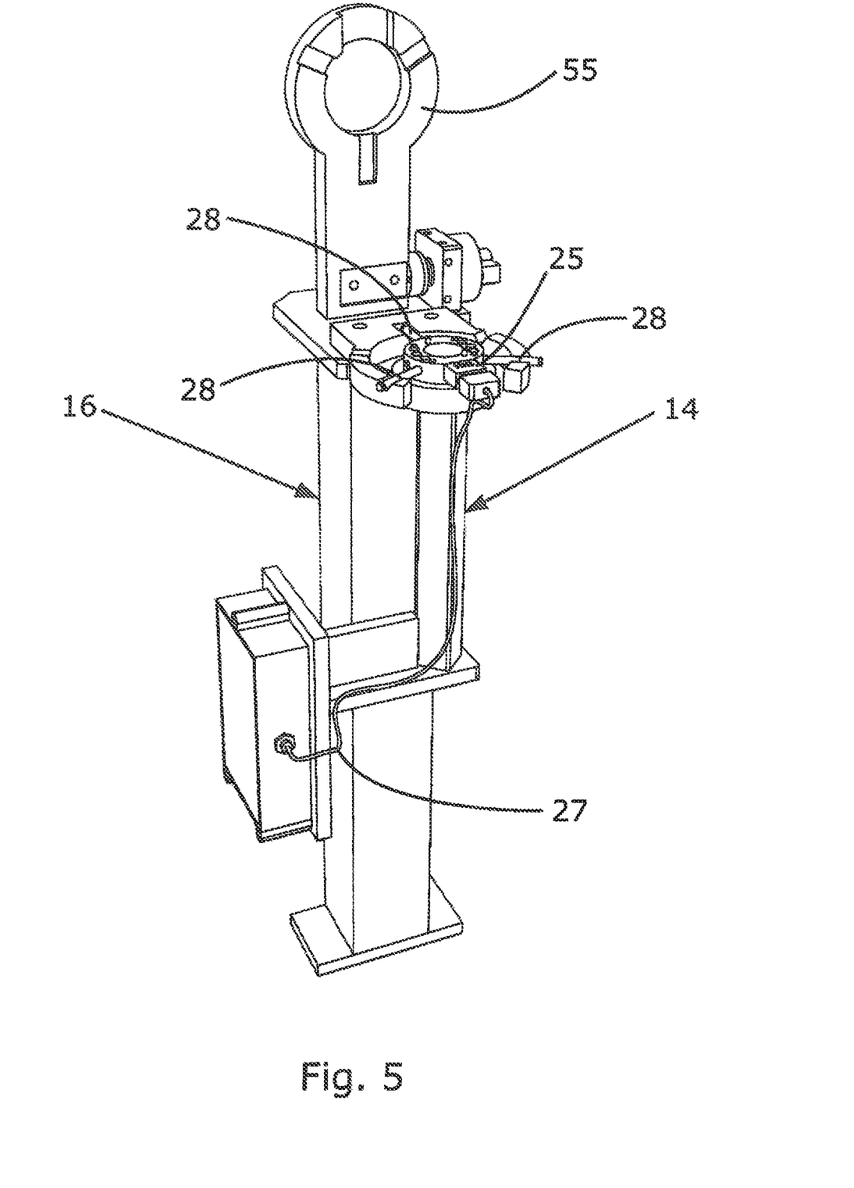
FIG. 5 is a view of the laser assembly located within the stand of FIG. 4.
Figure 6:
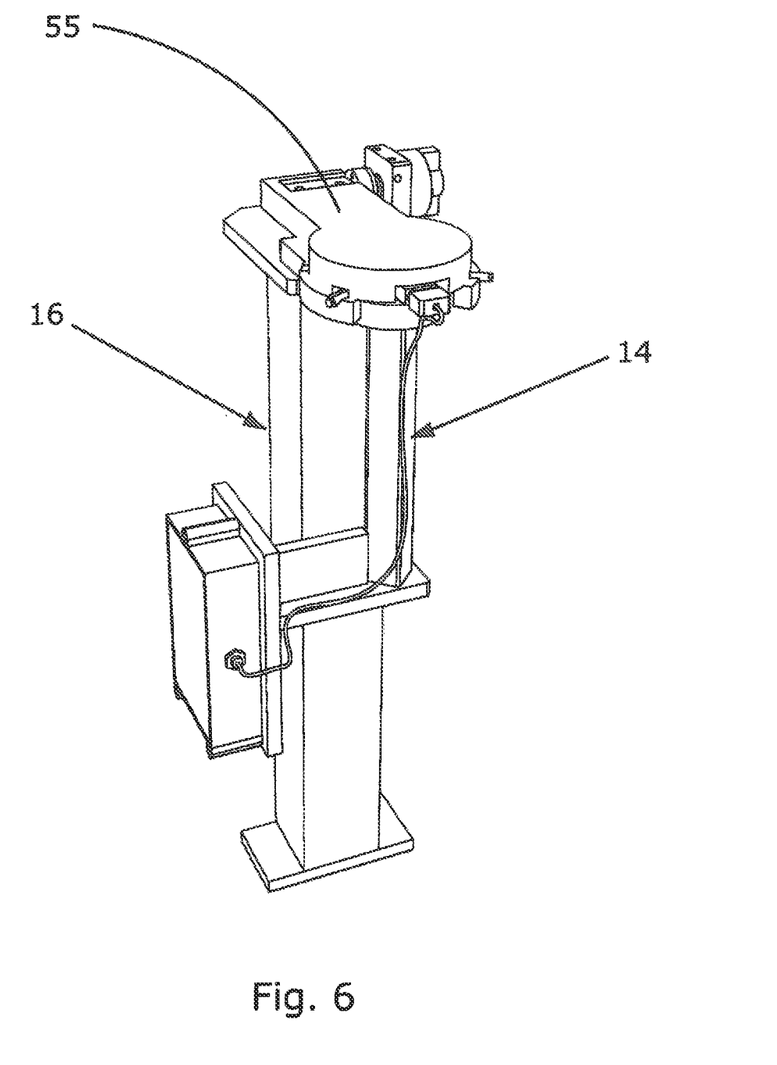
FIG. 6 is a view of the stand of FIG. 5 with a protective tool cover in place.

FIG. 5 shows the laser assembly 14 placed in the stand 16, and FIG. 6 shows the cover 55 positioned such as to protect the tool interface 24 and electrical module 25.

Figure 7:
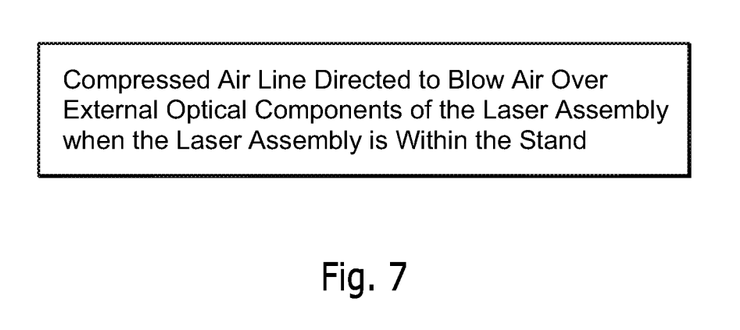
FIG. 7 is a schematic view of a further feature of the invention.

A further feature of the system is an air line (schematically shown in Figure located adjacent to the stand 16 used to blast clean the windows 21 and 22 of the laser displacement sensor 20 and thus remove any dust that may interfere with measurements.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

Any discussion of the prior art throughout the specification should in no way be considered as an admission that such prior art is widely known or forms part of the common general knowledge in this field.

In the summary of the invention and the claims, except where the context requires otherwise due to express language or necessary implication, the word "comprising" is used in the sense of "including", i.e. the features specified may be associated with further features in various embodiments of the invention.

The invention claimed is:

1. A system for reconditioning barrels comprising:
a robot arm;
a router assembly for routing the inside surface of one of the barrels;
a laser assembly for measuring the inside profile of the one barrel,
a floor on which the one barrel is stood; and
a clamping mechanism for securing the one barrel, and
trap doors beneath the clamping mechanism and swingably attached to the floor for movement from a first position wherein the one barrel is supported by the trap doors to a second position wherein the barrel is not supported by the trap doors,
wherein:
the router assembly is fixedly attached to the robot arm; and
the laser assembly is removably attached to the router assembly.

2. A system as in claim 1 further comprising a stand for accepting the laser assembly when the laser assembly is detached from the router assembly.

3. A system as in claim 2 wherein said stand incorporates a moveable cover for covering electrical contacts of said laser assembly.

4. A system as in claim 2 further comprising a compressed air line, said air line directed to blow air over external optical components of said laser assembly when said laser assembly is within said stand.

* * * * *